US009106921B2

(12) United States Patent
Wang

(10) Patent No.: US 9,106,921 B2
(45) Date of Patent: Aug. 11, 2015

(54) CONFIGURABLE TRANSCODER AND METHODS FOR USE THEREWITH

(75) Inventor: Yimin (Jim) Wang, Richmond Hill (CA)

(73) Assignee: VIXS Systems, INC, Toronto, Ontario (CA)

( * ) Notice: Subject to any disclaimer, the term of this patent is extended or adjusted under 35 U.S.C. 154(b) by 598 days.

(21) Appl. No.: 13/454,798

(22) Filed: Apr. 24, 2012

(65) Prior Publication Data

US 2013/0279602 A1    Oct. 24, 2013

(51) Int. Cl.
*H04N 7/58*        (2006.01)
*H04N 19/40*       (2014.01)
*H04N 21/222*      (2011.01)
*H04N 21/2365*     (2011.01)
*H04N 21/234*      (2011.01)
*H04N 19/12*       (2014.01)
*H04N 19/136*      (2014.01)

(52) U.S. Cl.
CPC ............ *H04N 19/40* (2014.11); *H04N 21/222* (2013.01); *H04N 21/2365* (2013.01); *H04N 21/23406* (2013.01); *H04N 19/12* (2014.11); *H04N 19/136* (2014.11)

(58) Field of Classification Search
CPC .............................................. H04N 19/00472
USPC .................................................... 375/240.26
See application file for complete search history.

(56) References Cited

U.S. PATENT DOCUMENTS

| 6,167,084 | A  | * | 12/2000 | Wang et al. | 375/240.02 |
| 6,310,915 | B1 | * | 10/2001 | Wells et al. | 375/240.03 |
| 6,463,445 | B1 | * | 10/2002 | Suzuki et al. | 1/1 |
| 6,748,020 | B1 | * | 6/2004  | Eifrig et al. | 375/240.26 |
| 8,085,855 | B2 | * | 12/2011 | Bennett | 375/240.26 |
| 8,270,487 | B1 | * | 9/2012  | Kizhepat et al. | 375/240.12 |
| 8,521,541 | B2 | * | 8/2013  | Yi et al. | 704/501 |

* cited by examiner

*Primary Examiner* — William C Vaughn, Jr.
*Assistant Examiner* — Luis Perez Fuentes
(74) *Attorney, Agent, or Firm* — Garlick & Markison; Bruce E. Stuckman

(57) ABSTRACT

A transcoder includes a demultiplexer that demultiplexes a video signal into a video stream, an audio stream and a subtitle stream. A stream probe generates stream format identification data based on the video signal. A transcoder configuration module generates hardware/software configuration data based on the stream format identification data. The hardware/software configuration data configures a plurality of hardware transcoders and the processing device to operate to generate a transcoded video stream, a transcoded audio stream and processed subtitle stream via selected hardware and software blocks. A remultiplexer generates the processed video signal by remultiplexing the transcoded video stream, the transcoded audio stream and the processed subtitle stream, based on the hardware/software configuration data.

16 Claims, 10 Drawing Sheets

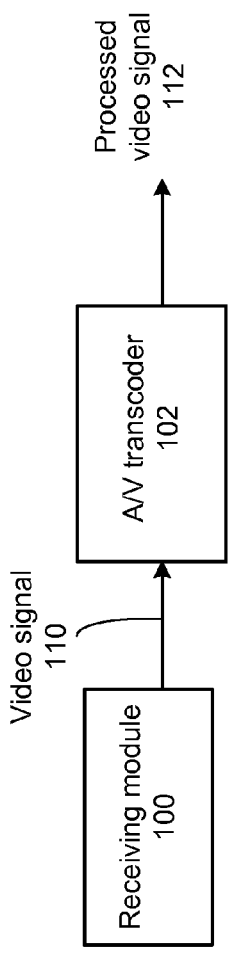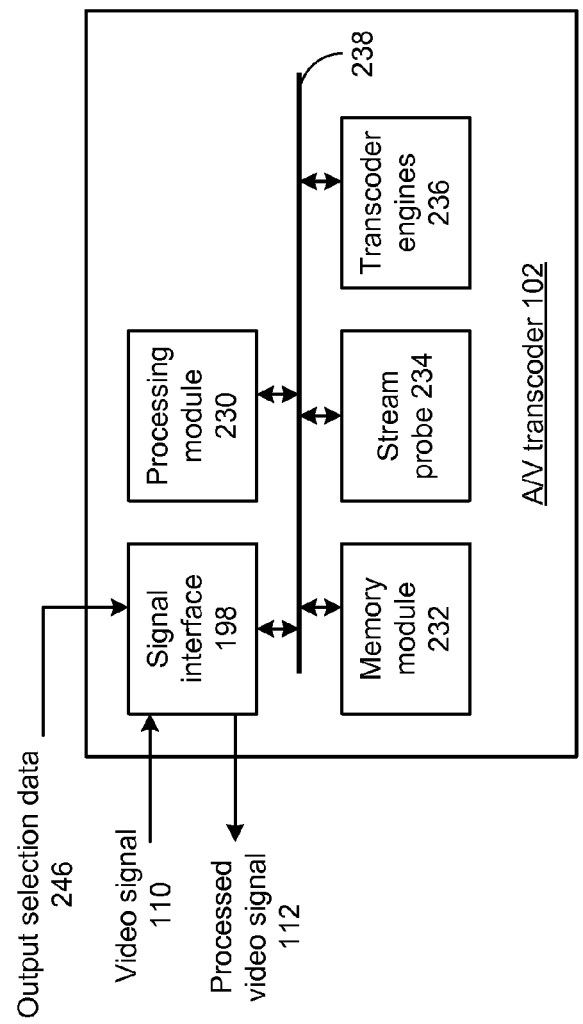

CONFIGURABLE TRANSCODER AND METHODS FOR USE THEREWITH

CROSS REFERENCE TO RELATED PATENTS

None

TECHNICAL FIELD OF THE INVENTION

The present invention relates to coding used in devices such as video transcoders.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to higher resolution and better picture quality. Standards have been promulgated for many encoding methods including the H.264 standard that is also referred to as MPEG-4, part 10 or Advanced Video Coding, (AVC). Other encoding formats are also in use, based on the application, device capabilities, and other factors.

When a video signal is encoded in one format, it is sometimes desirable to convert the format of the video signal into another encoding format for storage, transmission or device compatibility. The conversion of a video signal or stream from one format into another format is called video transcoding. For example, multimedia stream content can required transcoding when porting the content to mobile devices with limited decoding capabilities, or saving bandwidth for storage or transportation. Video transcoding can be a computationally complex task for high resolution video signals requiring large amounts of computation and storage.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 1 presents a block diagram representation of a video processing system that includes A/V transcoder 102 in accordance with an embodiment of the present invention.

FIG. 2 presents a block diagram representation of an A/V transcoder 102 in accordance with an embodiment of the present invention.

Figure 4:
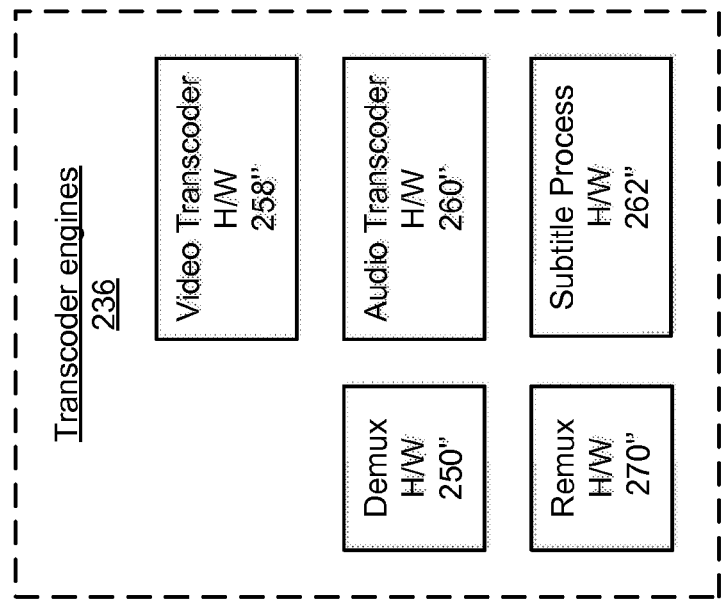
FIG. 4 presents a block diagram representation of transcoder engines 236 in accordance with a further embodiment of the present invention.

DETAILED DESCRIPTION OF THE INVENTION INCLUDING THE PRESENTLY PREFERRED EMBODIMENTS

FIG. 1 presents a block diagram representation of a video processing system that includes A/V (audio/video) transcoder 102 in accordance with an embodiment of the present invention. In particular, a video processing system includes a receiving module 100, such as a video server, set-top box, television receiver, personal computer, cable television receiver, satellite broadcast receiver, broadband modem, 3G transceiver, network node, cable headend or other information receiver or transceiver that is capable of receiving one or more video signals 110 from one or more sources such as video content providers, a broadcast cable system, a broadcast satellite system, the Internet, a digital video disc player, a digital video recorder, or other video source. A/V transcoder 102 is coupled to the receiving module 100 to transcode one or more of the video signals 110 to form processed video signal 112.

In an embodiment of the present invention, the video signals 110 can include a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, the video signals 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet. As such, the video signal 110 can be a multimedia signal that includes video content, audio content, subtitle information, metadata and other data.

The video signal 110 and/or processed video signal 112 can each be a digital video signal in a compressed digital video format such as H.264, MPEG-4 Part 10 Advanced Video Coding (AVC) or other digital format such as a Moving Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary. The video signal 110 and the processed video signal 112 may be optionally encrypted, may include corresponding audio, metadata and subtitle data and may be formatted for transport via one or more container formats. Examples of such container formats are encrypted Internet Protocol (IP) packets such as used in IP TV, Digital Transmission Content Protection (DTCP), etc. In this case the payload of IP packets contain several transport stream (TS) packets and the entire payload of the IP packet is encrypted. Other examples of container formats include encrypted TS streams used in Satellite/Cable Broadcast, etc. In these cases, the payload of TS packets contain packetized elementary stream (PES) packets. Further, digital video discs (DVDs) and Blu-Ray Discs (BDs) utilize PES streams where the payload of each PES packet is encrypted.

In operation, A/V transcoder 102 transcodes the video signal 110 into a processed video signal 112 by decoding the video signal 110 from the compression and/or container format in which it is received and re-encodes the content in a different compression and/or container format as processed video signal 112. The transcoding of the video signal 110 into processed video signal 112 can include altering video parameters in addition to the compression format such as the codec, bit rate, resolution, frame rate, color depth of the video signal. In addition, the transcoding of the video signal 110 transcoding of the audio, video and reformatting of the subtitle information and other information contained in video signal 110.

As discussed above, the video signal 110 can include multimedia content in a source container format that includes video and audio. The transcoding process involves demultiplexing to extract the sub-streams from the source container format, transcoding or otherwise processing the individual streams as required to conform with the output format and remultiplexing the multiple sub-streams into the final container format. The transcoding process can be a very power/cycle consuming task, especially for video and audio content. While transcoding can be performed in software, hardware accelerators can be employed for popular video/audio formats in order to increase the transcoding speed. Some source and destination formats are suitable for software processing and others can be accelerated via hardware.

The A/V transcoder 102 includes a plurality of interchangeable hardware and software processing blocks. In particular, the A/V transcoder 102 improves the transcoding performance via a mixture of hardware and software processing that is customized to the formats of video signal 110 and processed video signal 112. In operation, stream format identification data is generated by the A/V transcoder 102 based on the properties of video signal 110 and output selection data is collected that specifies the output format of processed video signal 112. This stream format identification data and output selection data are used to configure each portion of the A/V transcoder to be implemented via either hardware or software.

The A/V transcoder 102 can be implemented in conjunction with many optional functions and features described in conjunction with FIGS. 2-17 that follow.

FIG. 2 presents a block diagram representation of a A/V transcoder 102 in accordance with an embodiment of the present invention. In particular, A/V transcoder 102 includes a signal interface for receiving video signal 110 and output selection data 246 and also for outputting the processed video signal 112. The A/V transcoder 102 also includes a stream probe 234 that monitors the video signal 110 in order to identify the container format, compression format and other formatting properties of video signal 110. The stream probe 234 generates stream format identification data in response to this identification. The A/V transcoder 102 further includes a processing module 230, memory module 232, and transcoder engines 236.

The processing module 230 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 232. Memory module 232 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 230 and memory module 232 are coupled, via bus 238, to the signal interface 198 and the other modules of A/V transcoder 102. In an embodiment of the present invention, the signal interface 198 and stream probe 234 each operate in conjunction with the processing module 230 and memory module 232. The modules of video processing module 102 can each be implemented in software, firmware or hardware, depending on the particular implementation of processing module 230. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

As discussed in conjunction with FIG. 1, the A/V transcoder 102 includes a plurality of interchangeable hardware and software processing blocks to perform the transcoding of video signal 110 into processed video signal 112. The software processing blocks are implemented via software stored in memory module 232 that configure the processing module 230 to perform a particular transcoding task. In contrast, the hardware processing blocks are implemented via transcoder engines 236. Each of the transcoder engines 236 can be a dedicated hardware engine or other hardware accelerator that operates under the control of, but otherwise independently from the processing module 230. The transcoder engines 236 can include one or more a field programmable gate arrays, programmable logic devices, state machines, logic circuits, digital circuits, dedicated processing elements and/or any other devices that manipulate digital data or signals.

Figure 3:
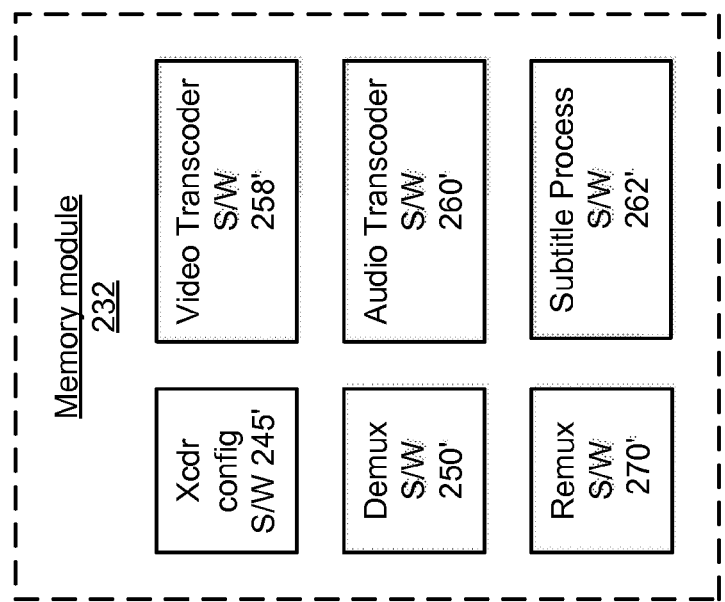
FIG. 3 presents a block diagram representation of a memory module 232 in accordance with an embodiment of the present invention.

Examples of specific transcoder engines 236 and software transcoding blocks are presented in conjunction with FIGS. 3 and 4 that follow.

FIG. 3 presents a block diagram representation of a memory module 232 in accordance with an embodiment of the present invention. In particular, memory module 232 includes transcoder configuration software 245', demultiplexer software 250', video transcoder software 258', audio transcoder software 260', subtitle process software 262' and remultiplexer software 270'. These software processing blocks include operational instructions that, when executed by processing module 230, configure the processing module 230 to perform a particular transcoding task.

While each of these software modules of memory module 232 are each represented as a single block, it should be noted that each of these modules can themselves contain individual blocks that can be selectively enabled or disabled, depending on whether the functionality of the block is required by the particular source and destination format in use and further depending on whether the functionality of a particular block is being implemented via hardware or software. It should also be noted that while particular software modules of memory module 232 are shown, memory module 232 optionally includes other software modules, including other transcoding software, an operating system, general utilities and drivers and other software that is not specifically shown.

FIG. 4 presents a block diagram representation of transcoder engines 236 in accordance with a further embodiment of the present invention. In particular, transcoder engines 236 include demultiplexer hardware 250", video transcoder hardware 258", audio transcoder hardware 260", subtitle process hardware 262" and remultiplexer hardware 270". As discussed in conjunction with FIG. 2, each of the transcoder engines 236 can be dedicated a hardware engine or other hardware accelerator that operates under the control of, but otherwise independently from the processing module 230. The transcoder engines 236 can include one or more a field programmable gate arrays, programmable logic devices, state machines, logic circuits, digital circuits, dedicated processing elements and/or any other devices that manipulate digital data or signals.

While each of these hardware modules of transcoder engines 236 are each represented as a single block, it should be noted that each of these modules can themselves contain individual blocks that can be selectively enabled or disabled, depending on whether the functionality of the block is required by the particular source and destination format in use and further depending on whether the functionality of a particular block is being implemented via hardware or software. It should also be noted that while particular hardware modules are shown, the transcoder engines 236 optionally includes other hardware modules, including other transcoding hardware or other hardware, that are not specifically shown.

Figure 5:
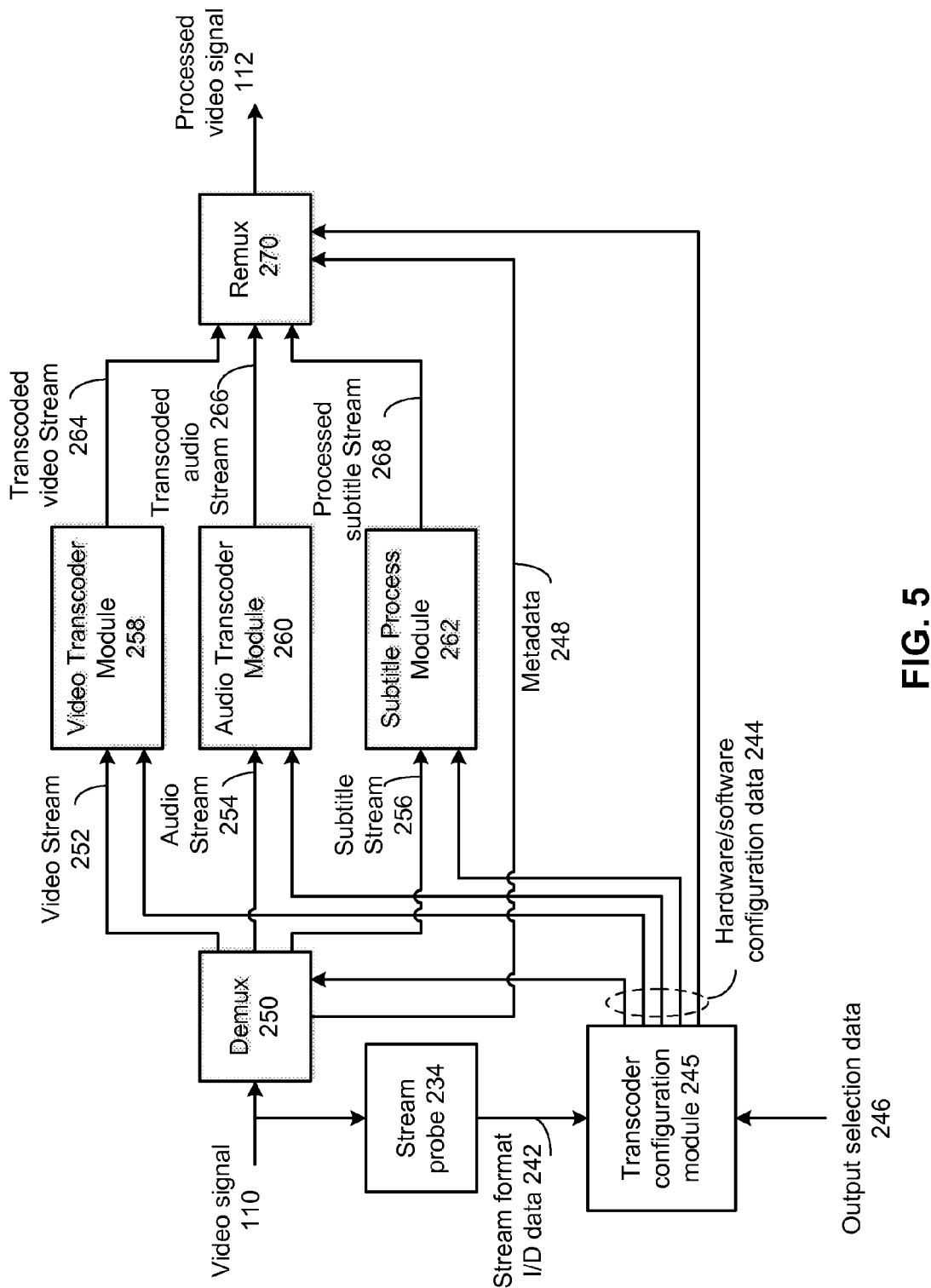
FIG. 5 presents a block diagram representation of data flow associated with a transcoder 102 in accordance with a further embodiment of the present invention.

FIG. 5 presents a block diagram representation of data flow associated with a transcoder 102 in accordance with a further embodiment of the present invention. In particular, an example is shown where the video signal 110 includes a multimedia signal that arrives in a particular container format. The sub-streams of the signal are separated and transcoded and then remultiplexed in the same container format or in a different container format, and output as processed video signal 112.

In operation, demultiplexer 250 unpacks the container format of video signal 110, decrypts the video signal 110, if encrypted, and demultiplexes the video signal 110 into a video stream 252, an audio stream 254, a subtitle stream 256 and metadata 248. The metadata can include video indexing data, images, such as menu data and other images and other data associated with video signal 110. The video transcoder module 258 transcodes the video stream 252 into the selected format of transcoded video stream 264. The audio transcoder module 260 transcodes the audio stream 254 into the selected format of transcoded audio stream 266. The subtitle process module 262 processes the subtitle stream 256 into the selected format of processed subtitle stream 268. The remultiplexer module 270 optionally encrypts or re-encrypts and remultiplexes the transcoded video stream 264, the transcoded audio stream 266, the processed subtitle stream 268 and the metadata 248 to form the processed video signal 112.

The stream probe 234 probes the video signal 110 and generates stream format identification data 242 in response thereto. The stream probe 234 can be implemented via a stream parser or other hardware or software to identify the input stream container format and the basic video/audio format information, and generate the stream format identification data 242. The stream format identification data 242 can include an indication of the container format, video compression format, audio compression format, and other parameters of the video signal 110. The transcoder configuration module 245 analyzes the stream format identification data 242 along with output selection data 246 that, for example, specifies the container format, video compression format, audio compression format, and other parameters of the processed video signal 112. In response to this analysis the transcoder configuration module 245 generates hardware/software configuration data 244 to configure each of hardware transcoders of transcoder engines 236 and the software modules of memory module 232 to selectively operate. In this fashion, the demultiplexer (demux) 250, video transcoder module 258, audio transcoder module 260, and remultiplexer (remux) 270 can be each made to selectively operate to not only convert the format of the video signal 110 into format of processed video signal 112, but also to configure each module to operate based on corresponding hardware, corresponding software or a selected combination of hardware and software.

In an embodiment, the transcoder configuration module 245 operates based on transcoder configuration software 245' to implement a series of decision rules that attempt to optimize the selection of hardware or software for each of the functional blocks of the A/V transcoder 102. Most of the processes in video/audio transcoding require a large amount of processing power, and can be implemented most efficiently by hardware—freeing up a CPU cycles of processing module 230 for other operations. Likewise, demultiplexing and remultiplexing broadcast or streaming container formats such as Transport Stream (TS) and Program Stream (PS) can be easily implemented by both software and hardware. But due to the small packet sizes, pure software implementations can sometimes result in high CPU cache loss, slowing down concurrent operations. Other container formats such as Internet container formats (i.e. MKV), are not easy to implemented using hardware, and it may be more economical to implement via software. In addition, hardware support for some compression and container formats may not be provided. Properly choosing a hardware/software configuration can improve the overall system performance significantly.

The decision rules of transcoder configuration module 245 can be based on the system capabilities of hardware/software acceleration. Such system capabilities include demux hardware and software support for the container format of video signal 110, remux hardware and software support for the container format of processed video signal 112, availability of hardware support for selected video codec formats, for decoding and/or encoding, availability of hardware support for certain audio codec formats, for decoding and/or encoding, the availability of hardware support for video filtering such as deblocking, deinterlacing, denoising, etc., the availability of hardware support for video scaling, color space format conversion, audio resampling for selected input/output sampling rate combinations, audio sample format conversions including fixed/float point, bit-width, etc., audio downmixing for certain codecs, and other transcoding processes performed by demux, 250, video transcoder module 258, audio transcoder module 260, subtitle process module 262, remux 270 or any portions thereof.

The decision rules of transcoder configuration module 245 attempt to achieve the maximum transcoding performance within the confines of the available hardware and software resources. Examples of decision rules are provided below:

If the input container format is supported by the demux hardware 250", choose a hardware demux mode, otherwise use the demux software 250'

If the output container format is supported by the remux hardware 270", choose a hardware remux mode, otherwise use the remux software 270'

If the input video codec format and the properties are in the hardware capability range of video transcoder hardware 258", choose a hardware video decoder, otherwise use a software video decoder from video transcoder software 258'

If the input audio codec format and the properties are in the hardware capability range of audio transcoder hardware 260", choose a hardware audio decoder, otherwise use a software audio decoder from audio transcoder software 260'

If the output video codec format and the properties are in the hardware capability range of video transcoder hardware 258", choose a hardware video encoder, otherwise use a software video encoder from video transcoder software 258'

If the output audio codec format and the properties are in the hardware capability range of audio transcoder hardware 260", choose a hardware audio encoder, otherwise use a software audio encoder from audio transcoder software 260'

If both the video decoder and encoder are running at hardware mode, color space conversion, filtering and scaling can all run at hardware mode using video transcoder 258"

If video decoder is running at software mode but the video encoder is at hardware mode, if the decode output color space can be supported by the hardware color space converter of video transcoder hardware 258", hardware color space conversion will be used, otherwise software color space conversion via video transcoder hardware 258'. Filtering and scaling can run via hardware of video transcoder hardware 258", if supported.

If video decoder is at hardware mode and video encoder is at software mode, color space conversion, filtering and can run via hardware of video transcoder hardware 258", if supported.

If both video decoder and encoder are both running in software mode, color space conversion, filtering and scaling can all be performed via video transcoder software 258'

If hardware is selected to implement both the audio decoder and encoder, format conversion, resampling and downmixing can be implemented via audio transcoder hardware 260"

If the audio decoder is software mode and a hardware audio encoder is used, if audio decoder output format can be recognized by the hardware format convertor, a hardware format convertor of audio transcoder hardware 260" can be used, otherwise a software format convertor of audio transcoder software 260' can be employed. In either case, resampling and downmixing can be run via audio transcoder hardware 260"

If audio decoder is hardware mode and a software audio encoder is used, format conversion, resampling and downmixing can be implemented via audio transcoder software 260'

If both software audio decoder and hardware encoder are chosen, format conversion, resampling and downmixing block can be implemented via audio transcoder software 260'

If the amount of subtitle data in subtitle stream 256 is less than some threshold, subtitle process software 262' can be employed, otherwise subtitle process hardware 262" can be used. It should be noted that in some implementations subtitle process hardware 262" can be removed and subtitle process software 262' can be employed exclusively.

While a number of decision rules of transcoder configuration module 245 are presented above, a greater or fewer number of decision rules can be employed. Other algorithms can likewise be used that include other decision-making principles.

Figure 6:
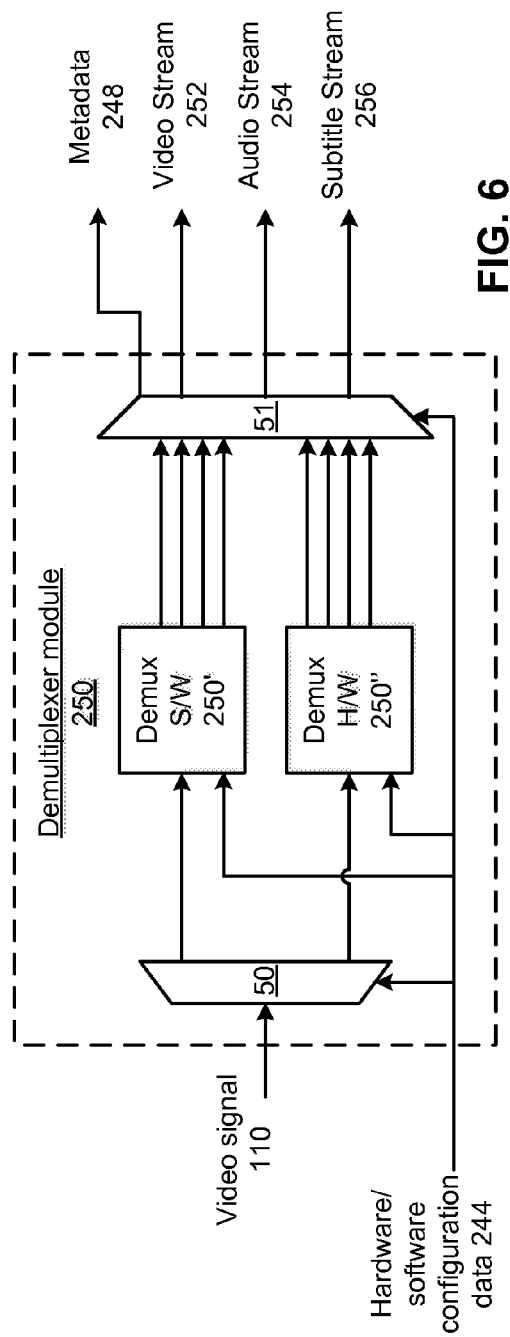
FIG. 6 presents a block diagram representation of data flow associated with a demultiplexer module 250 in accordance with a further embodiment of the present invention.

FIG. 6 presents a block diagram representation of data flow associated with a demultiplexer module 250 in accordance with a further embodiment of the present invention. In this embodiment, switch functions 50 and 51 operate based on hardware/software configuration data 244 from transcoder configuration module 245 to select between demux software 250' and demux hardware 250". In this fashion, either a hardware or software configuration can be implemented. In addition, specific settings of either demux software 250' or demux hardware 250" can be configured based on the particular input container format of video signal 110 indicated by hardware/software configuration data 244.

Figure 7:
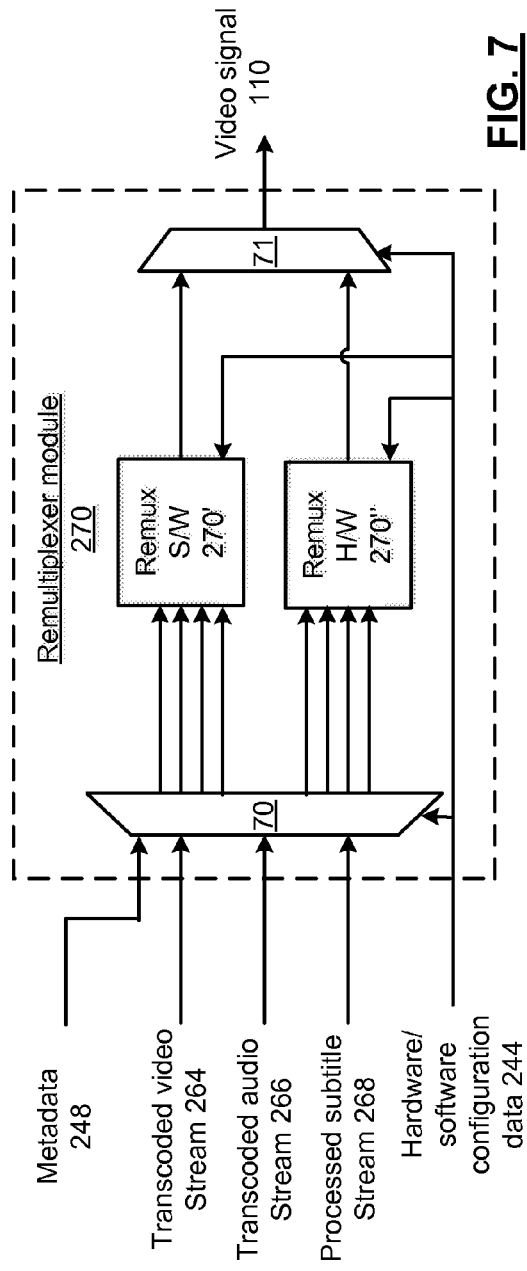
FIG. 7 presents a block diagram representation of data flow associated with a remultiplexer module 270 in accordance with a further embodiment of the present invention.

FIG. 7 presents a block diagram representation of data flow associated with a remultiplexer module 270 in accordance with a further embodiment of the present invention. In this embodiment, switch functions 70 and 71 operate based on hardware/software configuration data 244 from transcoder configuration module 245 to select between remux software 270' and remux hardware 270". In this fashion, either a hardware or software configuration can be implemented. In addition, specific settings of either remux software 270' or remux hardware 270" can be configured based on the particular output container format of processed video signal 112 indicated by hardware/software configuration data 244.

Figure 8:
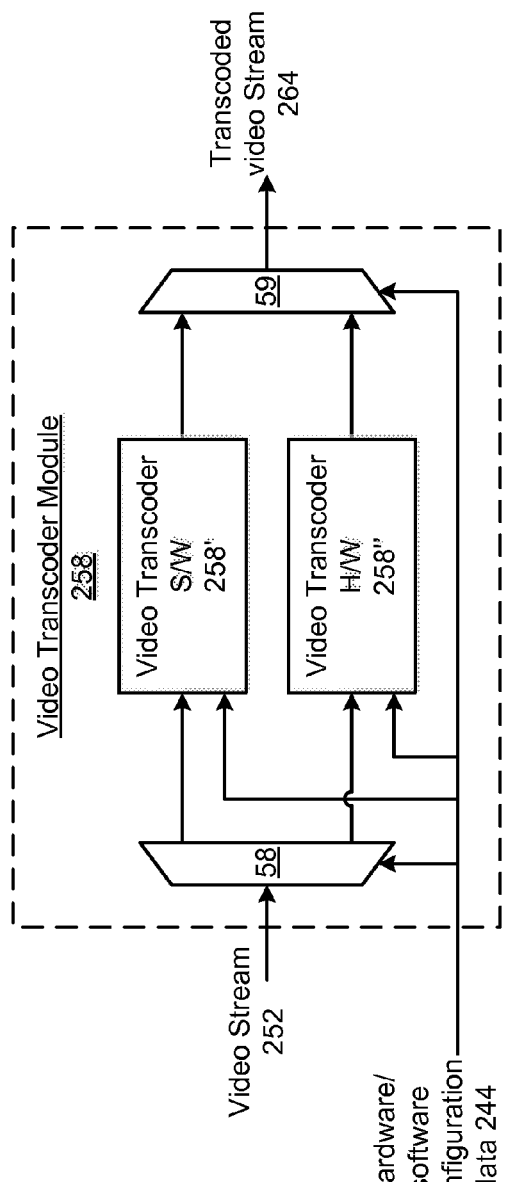
FIG. 8 presents a block diagram representation of data flow associated with a video transcoder module 258 in accordance with a further embodiment of the present invention.

FIG. 8 presents a block diagram representation of data flow associated with a video transcoder module 258 in accordance with a further embodiment of the present invention. In this embodiment, switch functions 58 and 59 operate based on hardware/software configuration data 244 from transcoder configuration module 245 to select between video transcoder software 258' and video transcoder hardware 258". In this fashion, either a hardware or software configuration can be implemented. In addition, specific settings of either video transcoder software 258' or video transcoder hardware 258" can be configured based on the particular input video compression format of video signal 110 and output video compression format of processed video signal 112 indicated by hardware/software configuration data 244. Examples of such video compression formats include H.264 standard formats, MPEG-4 standard formats, VC-1 (SMPTE standard 421M) format or other format.

Figure 9:
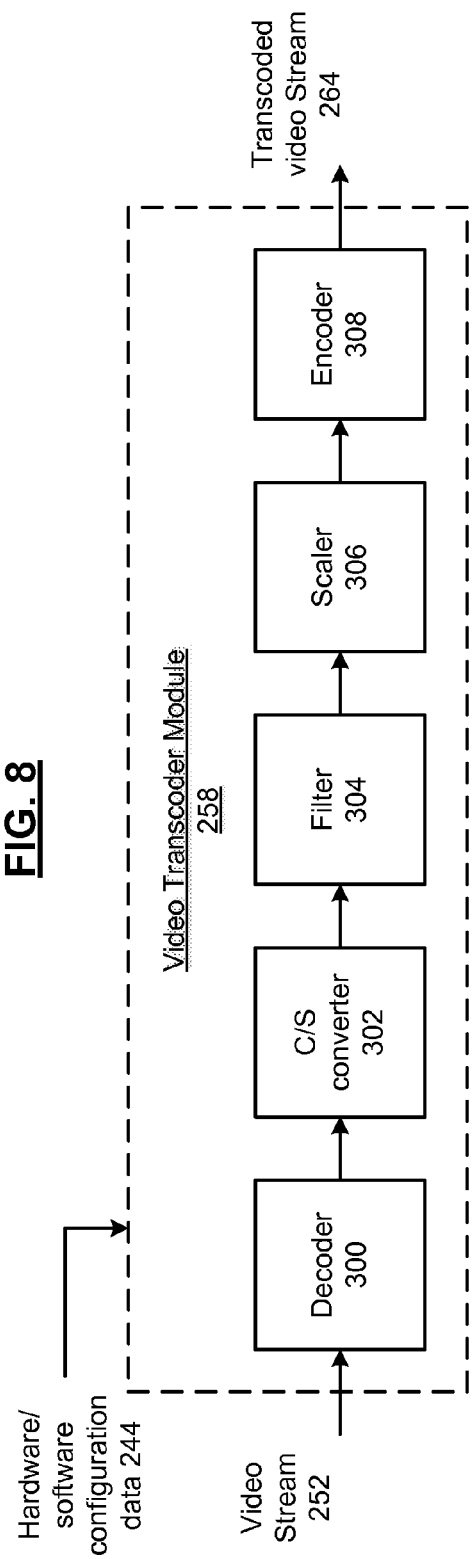
FIG. 9 presents a block diagram representation of data flow associated with a video transcoder module 258 in accordance with another embodiment of the present invention.

FIG. 9 presents a block diagram representation of data flow associated with a video transcoder module 258 in accordance with another embodiment of the present invention. In contrast to the embodiment of FIG. 8 where the entire video transcoder is implemented either entirely with hardware or software, as discussed in conjunction with FIG. 5, some portions of the video transcoder can be implemented in software while other portions can be implemented in hardware. This embodiment of video transcoder module 258 includes separate function blocks for decoder 300, color space converter 302, filter 304, scaler 306 and encoder 308. Each of these separate functional blocks can be individually configured in response to hardware/software configuration data 244, to operate via a corresponding functional block of video transcoder hardware 258" or video transcoder software 258'.

In particular, the video transcoder hardware 258" operates via a plurality of first video transcoding blocks and the video transcoder software 258' operates via a plurality of complementary second video transcoding blocks. In this fashion, there are both hardware and software implementations of the decoder 300, color space converter 302, filter 304, scaler 306 and encoder 308. The hardware/software configuration data 244 selects operation via a subset of the plurality of first video transcoding blocks and the plurality of second video transcoding blocks, with some of the functional blocks being implemented via hardware and the remaining functional blocks being implemented via software. In addition, specific settings of the selected functional blocks can be configured based on the particular input video compression format of video signal 110 and output video compression format of processed video signal 112 indicated by hardware/software configuration data 244.

Figure 10:
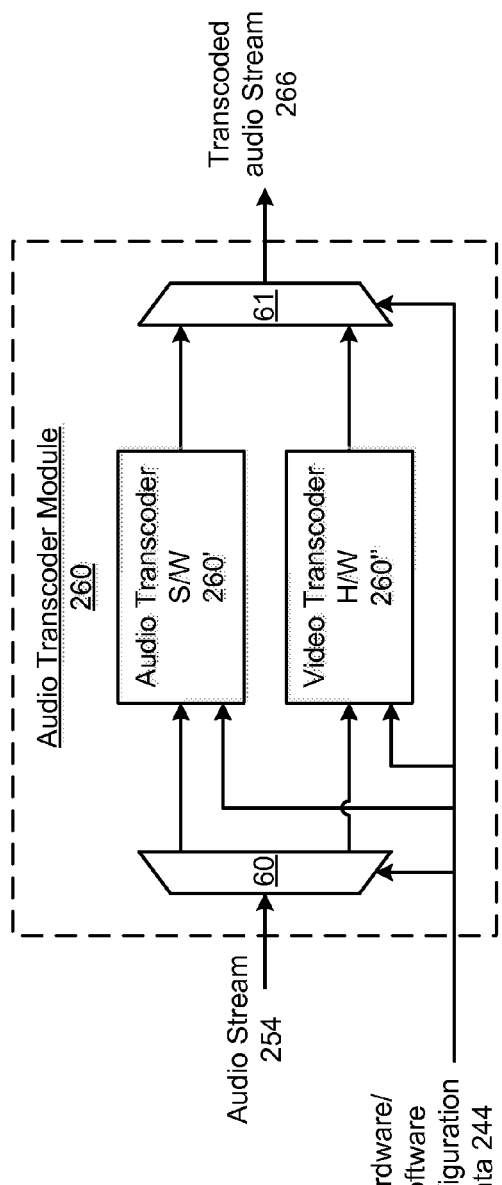
FIG. 10 presents a block diagram representation of data flow associated with an audio transcoder module 260 in accordance with a further embodiment of the present invention.

FIG. 10 presents a block diagram representation of data flow associated with an audio transcoder module 260 in accordance with a further embodiment of the present invention. In this embodiment, switch functions 60 and 61 operate based on hardware/software configuration data 244 from transcoder configuration module 245 to select between audio transcoder software 260' and audio transcoder hardware 260". In this fashion, either a hardware or software configuration can be implemented. In addition, specific settings of either audio software 260' or audio transcoder hardware 260" be configured based on the particular input audio compression format of video signal 110 and output audio compression format of processed video signal 112 indicated by hardware/software configuration data 244.

Figure 11:
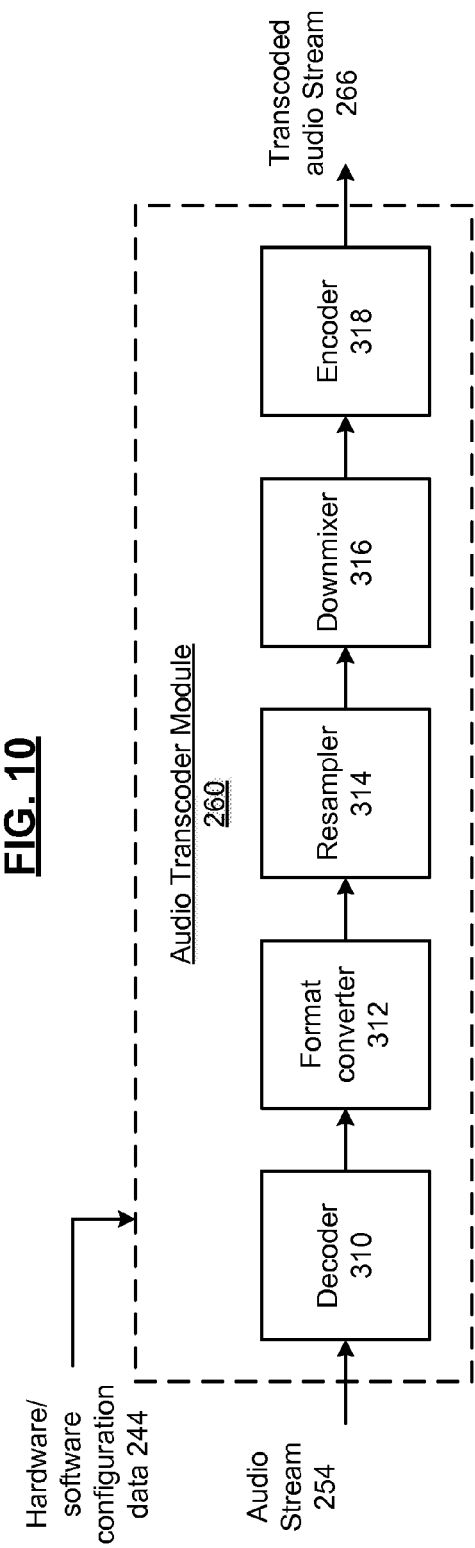
FIG. 11 presents a block diagram representation of data flow associated with an audio transcoder module 260 in accordance with another embodiment of the present invention.

FIG. 11 presents a block diagram representation of data flow associated with an audio transcoder module 260 in accordance with another embodiment of the present invention. In contrast to the embodiment of FIG. 10 where the entire audio transcoder is implemented either entirely with hardware or software, as discussed in conjunction with FIG. 5, some portions of the audio transcoder can be implemented in software while other portions can be implemented in hardware. This embodiment of audio transcoder module 260 includes separate function blocks for decoder 310, format converter 312, resampler 314, downmixer 316 and encoder 318. Each of these separate functional blocks can be individually configured in response to hardware/software configuration data 244, to operate via a corresponding functional block of audio transcoder hardware 260" or audio transcoder software 260'.

In particular, the audio transcoder hardware 260" operates via a plurality of first audio transcoding blocks and the audio transcoder software 260' operates via a plurality of complementary second audio transcoding blocks. In this fashion, there are both hardware and software implementations of the decoder 310, format converter 312, resampler 314, downmixer 316 and encoder 318. The hardware/software configuration data 244 selects operation via a subset of the plurality of first audio transcoding blocks and the plurality of second audio transcoding blocks, with some of the functional blocks being implemented via hardware and the remaining functional blocks being implemented via software. In addition, specific settings of the selected functional blocks can be configured based on the particular input audio compression format of video signal 110 and output audio compression format of processed video signal 112 indicated by hardware/software configuration data 244.

Figure 12:
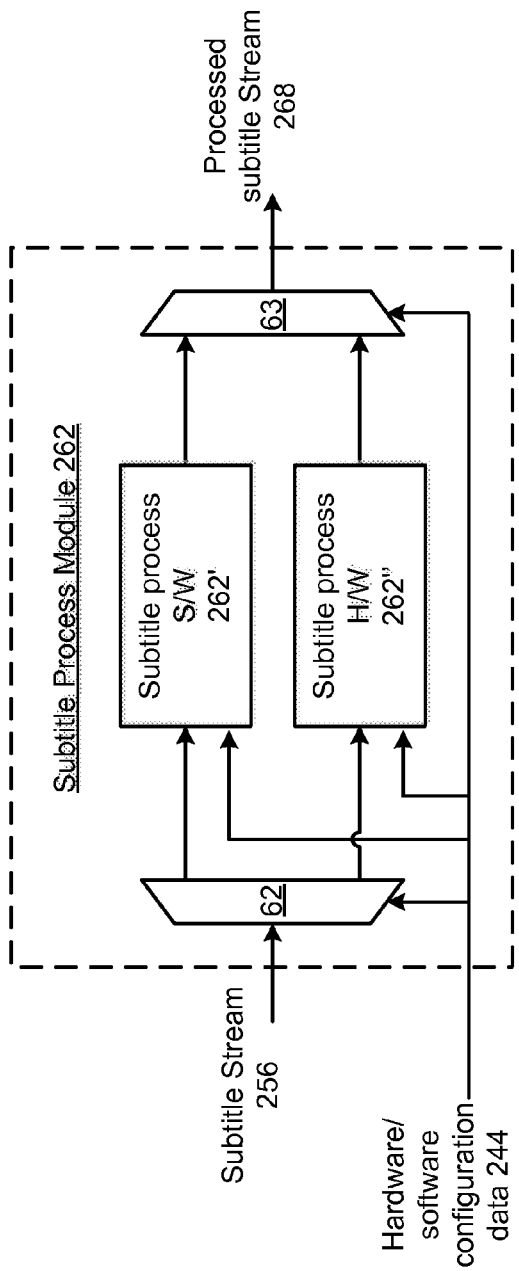
FIG. 12 presents a block diagram representation of data flow associated with an subtitle process module 262 in accordance with a further embodiment of the present invention.

FIG. 12 presents a block diagram representation of data flow associated with a subtitle process module 262 in accordance with a further embodiment of the present invention. In this embodiment, switch functions 62 and 63 operate based on hardware/software configuration data 244 from transcoder configuration module 245 to select between subtitle process software 262' and subtitle process hardware 262". In this fashion, either a hardware or software configuration can be implemented. In addition, specific settings of either subtitle process software 262' or subtitle process hardware 262" can be configured based on the particular input subtitle format of video signal 110 and output subtitle format of processed video signal 112 indicated by hardware/software configuration data 244. As discussed in conjunction with FIG. 5, in an alternative implementation, subtitle process hardware 262" can be removed and subtitle process software 262' can be employed exclusively.

Figure 13:
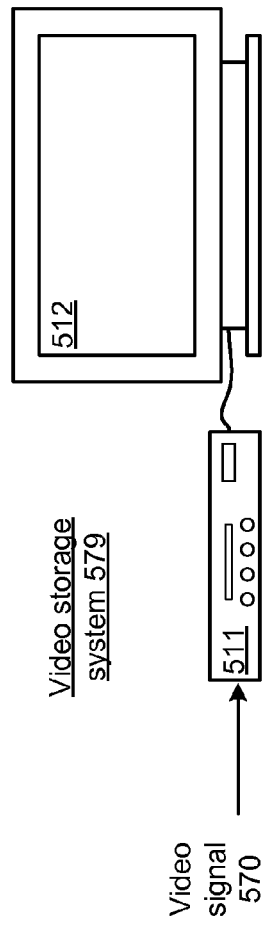
FIG. 13 presents a block diagram representation of a video storage system 79 in accordance with an embodiment of the present invention.

FIG. 13 presents a block diagram representation of a video storage system 579 in accordance with an embodiment of the present invention. In particular, device 511 is a set top box with built-in digital video recorder functionality, a stand alone digital video recorder, a DVD recorder/player or other device that records or otherwise stores a digital video signal for display on video display device such as television 512. The A/V transcoder 102 can be implemented in device 511 as part of the transcoding of the stored video signal for storage.

While these particular devices are illustrated, video storage system 579 can include a hard drive, flash memory device, computer, DVD burner, or any other device that is capable of generating, storing, transcoding and/or displaying a video signal in accordance with the methods and systems described in conjunction with the features and functions of the present invention as described herein.

Figure 14:
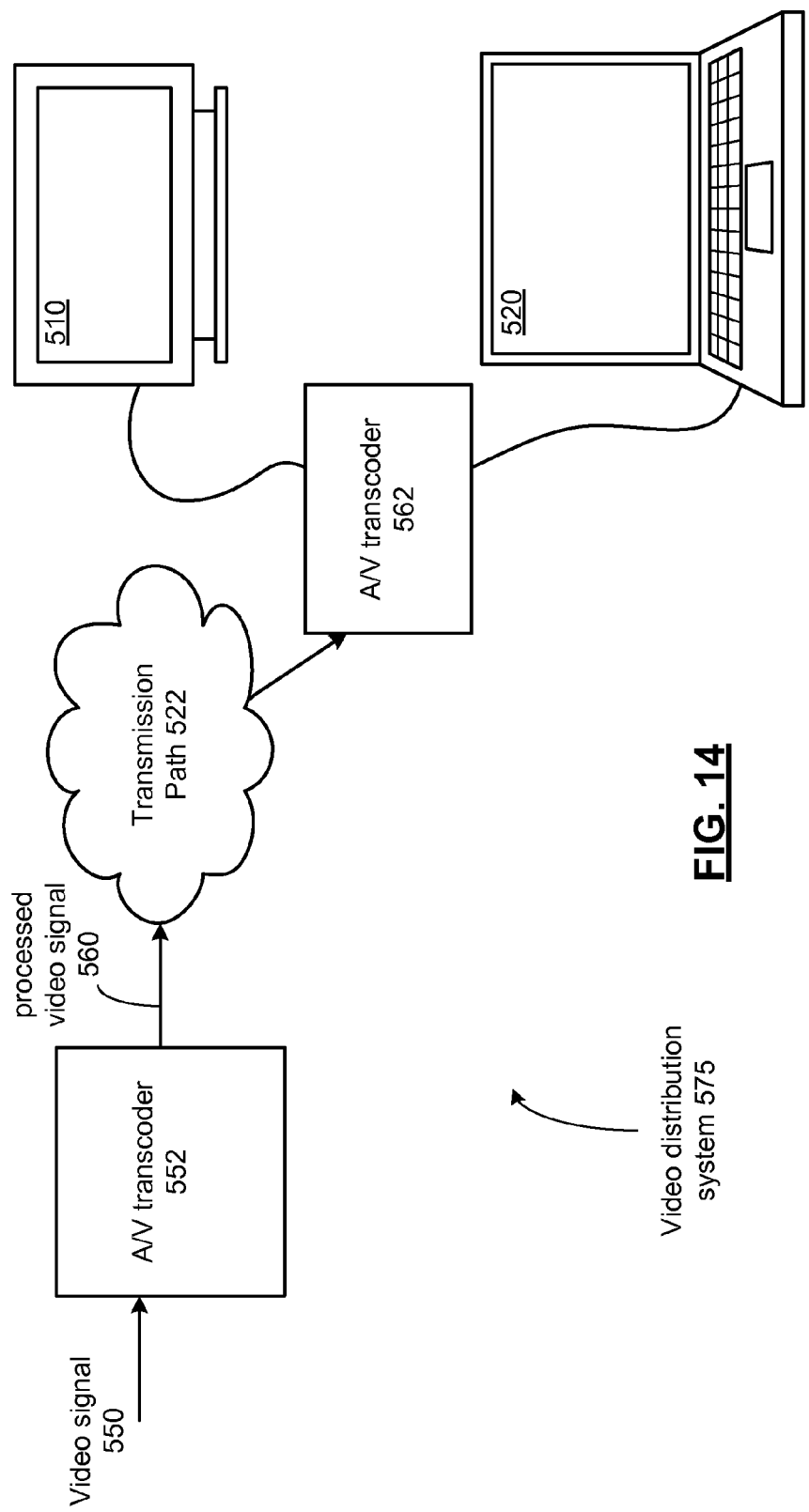
FIG. 14 presents a block diagram representation of a video distribution system 75 in accordance with an embodiment of the present invention.

FIG. 14 presents a block diagram representation of a video distribution system 575 in accordance with an embodiment of the present invention. In particular, a video signal 550 is transcoded by video transcoder 552 into processed video signal 560 for transmission via a transmission path 522 to an A/V transcoder 562. A/V transcoder 562, in turn can operate to transcode the video signal 560 for display on a display device such as television 510, computer 520 or other display device.

The transmission path 522 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 15:
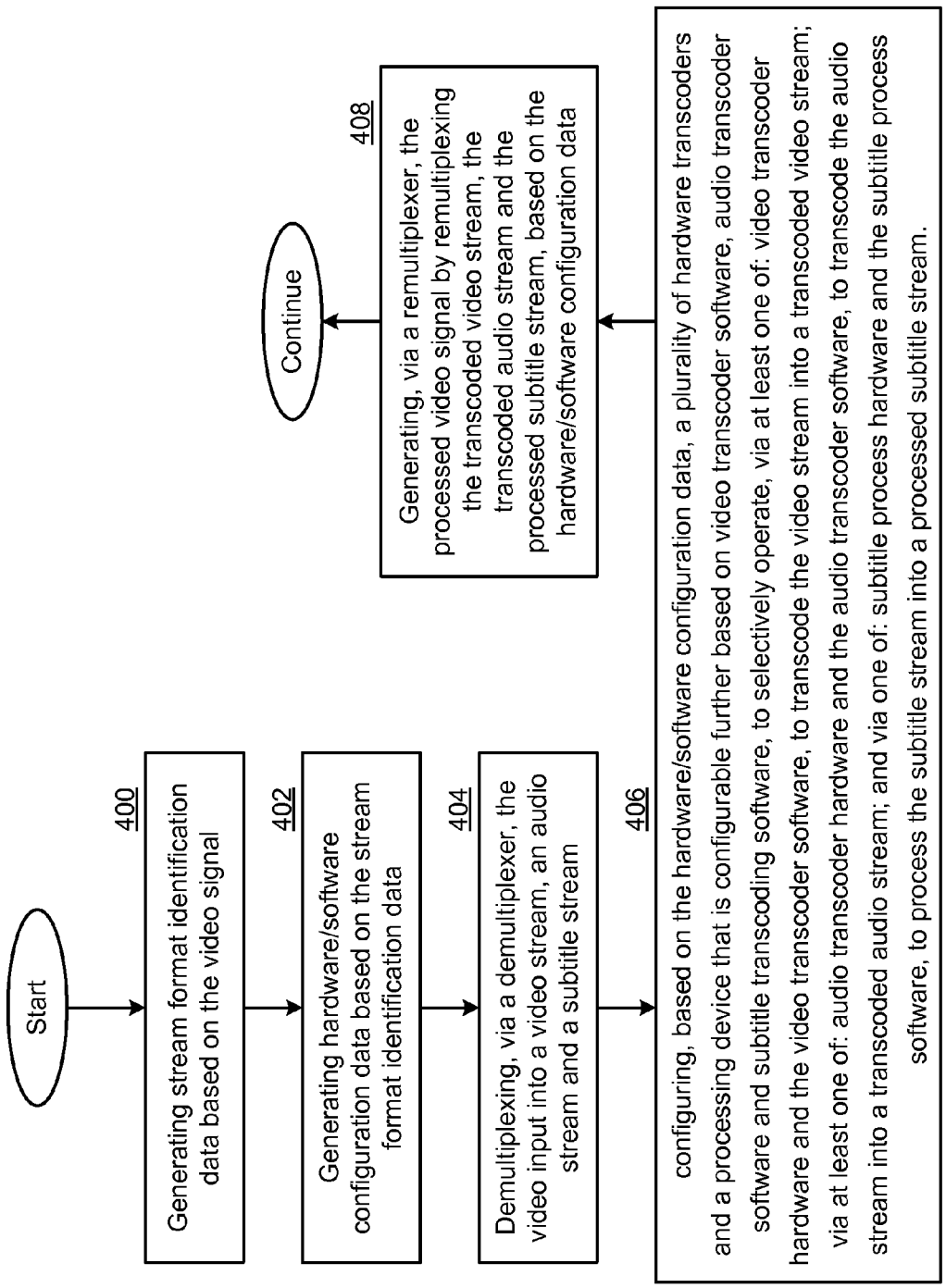
FIG. 15 presents a flowchart representation of a method in accordance with an embodiment of the present invention.

FIG. 15 presents a flowchart representation of a method in accordance with an embodiment of the present invention. In particular a method is presented for use in conjunction with one more functions and features described in conjunction with FIGS. 1-14. In step 400, stream format identification data is generated based on the video signal. In step 402, hardware/software configuration data is generated based on the stream format identification data. In step 404, the video signal is demultiplexed into a video stream, an audio stream and a subtitle stream, via a demultiplexer. In step 406, a plurality of hardware transcoders and a processing device that is configurable further based on video transcoder software, audio transcoder software and subtitle transcoding software, are configured based on the hardware/software configuration data. The configuration includes selective operation to transcode the video stream into a transcoded video stream via video transcoder hardware and/or the video transcoder software, selective operation to transcode the audio stream into a transcoded audio stream via audio transcoder hardware and/or the audio transcoder software, and selective operation to process the subtitle stream into a processed subtitle stream via subtitle process hardware or the subtitle process software. In step 408, the processed video signal is generated by remultiplexing the transcoded video stream, the transcoded audio stream and the processed subtitle stream, based on the hardware/software configuration data and via a remultiplexer.

In an embodiment, the stream identification data includes at least one of: a container format of the video signal and a compression format of the video signal. In step 406, the hardware/software configuration data can be generated further based on output selection data that indicates at least one of: a container format of the processed video signal and a compression format of the processed video signal and further based on a plurality of decision rules that are based on the stream identification data and the output selection data. In step 404, the video signal can be further demultiplexed into metadata and the processed video signal can be generated in step 408 by remultiplexing the transcoded video stream, the transcoded audio stream and the processed subtitle stream, further with the metadata. The video transcoder hardware can operates via a plurality of first video transcoding blocks and the video transcoder software can operates via a plurality of complementary second video transcoding blocks and the hardware/software configuration data can indicates operation via a subset of the plurality of first video transcoding blocks and the plurality of second video transcoding blocks. The audio transcoder hardware can operate via a plurality of first audio transcoding blocks and the audio transcoder software can operate via a plurality of complementary second audio transcoding blocks and the hardware/software configuration data can indicate operation via a subset of the plurality of first audio transcoding blocks and the plurality of second audio transcoding blocks.

Figure 16:
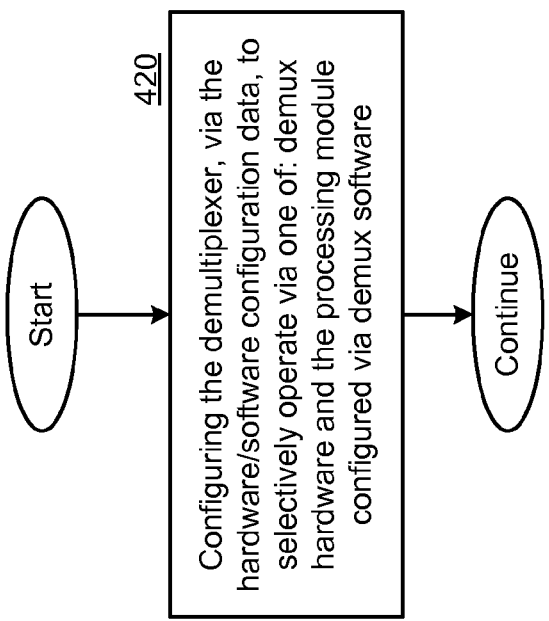
FIG. 16 presents a flowchart representation of a method in accordance with an embodiment of the present invention.

FIG. 16 presents a flowchart representation of a method in accordance with an embodiment of the present invention. In particular a method is presented for use in conjunction with one more functions and features described in conjunction with FIGS. 1-15. In step 420, the demultiplexer is configured, based on the hardware/software configuration data, to selectively operate via one of: demux hardware and the processing module configured via demux software.

Figure 17:
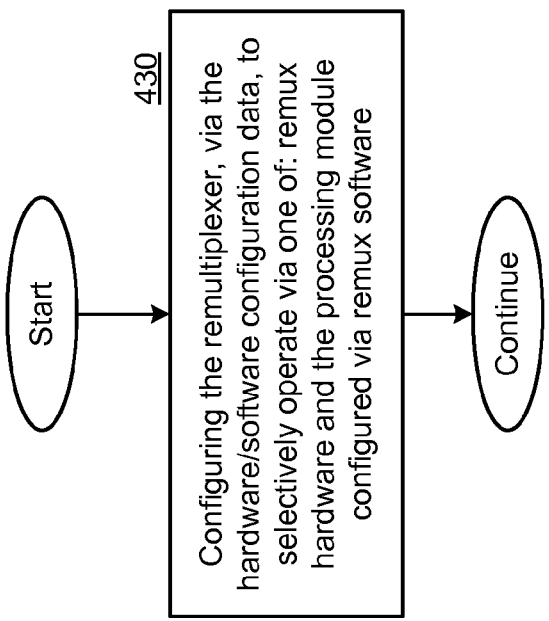
FIG. 17 presents a flowchart representation of a method in accordance with an embodiment of the present invention.

FIG. 17 presents a flowchart representation of a method in accordance with an embodiment of the present invention. In particular a method is presented for use in conjunction with one more functions and features described in conjunction with FIGS. 1-16. In step 430, the remultiplexer is configured, based on the hardware/software configuration data, to selectively operate via one of: remux hardware and the processing module configured via remux software.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A transcoder for converting video signal into a processed video signal, the transcoder comprising:
   a demultiplexer that demultiplexes the video signal into a moving image stream, an audio stream and a subtitle stream;
   stream probe that generates stream format identification data based on the video signal;
   a plurality of hardware transcoders, coupled to the demultiplexer, including moving image transcoder hardware, audio transcoder hardware and subtitle process hardware;
   a processing device, coupled to the demultiplexer, that is configurable based on moving image transcoder software, audio transcoder software and subtitle transcoding software;
   a transcoder configuration module, coupled to the demultiplexer, the stream probe, the plurality of hardware transcoders and the processing device that generates configuration data based on the stream format identification data and further based on output selection data that indicates:
      a container format of the processed video signal and
      a compression format of the processed video signal,
      wherein the configuration data configures the plurality of hardware transcoders and the processing device to selectively operate,
         via one of: the moving image transcoder hardware or the moving image transcoder software, to transcode the video stream into a transcoded video stream;
         via one of: the audio transcoder hardware or the audio transcoder software, to transcode the audio stream into a transcoded audio stream; and
         via one of: the subtitle process hardware or the subtitle transcoding software, to process the subtitle stream into a processed subtitle stream; and
   a remultiplexer, coupled to the transcoder configuration module, the plurality of hardware transcoders and the processing device, that generates the processed video signal by remultiplexing the transcoded video stream, the transcoded audio stream and the processed subtitle stream, based on the configuration data.

2. The transcoder of claim 1 wherein the stream identification data includes at least one of: a container format of the video signal and a compression format of the video signal.

3. The transcoder of claim 2 wherein the transcoder configuration module generates the configuration data based on a plurality of decision rules, based on the stream identification data and the output selection data.

4. The transcoder of claim 1 wherein the configuration data configures the demultiplexer to selectively operate via one of: demux hardware and the processing device configured via demux software.

5. The transcoder of claim 1 wherein the configuration data configures the remultiplexer to selectively operate via one of: remux hardware and the processing device configured via remux software.

6. The transcoder of claim 1 wherein the demultiplexer further demultiplexes the video signal into metadata and the remultiplexer is coupled to the demultiplexer to further generate the processed video signal based on the metadata.

7. The transcoder of claim 1 wherein the moving image transcoder hardware operates via a plurality of first moving image transcoding blocks and the moving image transcoder software operates via a plurality of complementary second moving image transcoding blocks and wherein the configuration data selects operation via a subset of the plurality of first moving image transcoding blocks and the plurality of second moving image transcoding blocks.

8. The transcoder of claim 1 wherein the audio transcoder hardware operates via a plurality of first audio transcoding blocks and the audio transcoder software operates via a plurality of complementary second audio transcoding blocks and wherein the configuration data selects operation via a subset of the plurality of first audio transcoding blocks and the plurality of second audio transcoding blocks.

9. A method for transcoding a video signal into a processed video signal, the method comprising:
- generating stream format identification data based on the video signal;
- generating configuration data based on the stream format identification data and further based on output selection data that indicates: a container format of the processed video signal and a compression format of the processed video signal;
- demultiplexing, via a demultiplexer, the video signal into a moving image stream, an audio stream and a subtitle stream;
- configuring,
  - based on the configuration data,
  - a plurality of hardware transcoders and
  - a processing device that is configurable further based on moving image transcoder software, audio transcoder software and subtitle transcoding software, to selectively operate,
    - via one of: moving image transcoder hardware or the moving image transcoder software, to transcode the video stream into a transcoded video stream;
    - via one of: audio transcoder hardware or the audio transcoder software, to transcode the audio stream into a transcoded audio stream; and
    - via one of: subtitle process hardware or the subtitle transcoding software, to process the subtitle stream into a processed subtitle stream; and
- generating, via a remultiplexer, the processed video signal by remultiplexing the transcoded video stream, the transcoded audio stream and the processed subtitle stream, based on the configuration data.

10. The method of claim 9 wherein the stream identification data includes at least one of: a container format of the video signal and a compression format of the video signal.

11. The method of claim 9 wherein the configuration data is generated further based on a plurality of decision rules that are based on the stream identification data and the output selection data.

12. The method of claim 9 further comprising:
configuring the demultiplexer, based on the configuration data, to selectively operate via one of: demux hardware and the processing device configured via demux software.

13. The method of claim 9 further comprising:
configuring the remultiplexer, based on the configuration data, to selectively operate via one of: remux hardware and the processing device configured via remux software.

14. The method of claim 9 wherein the video signal is further demultiplexed into metadata and wherein the processed video signal is generated by remultiplexing the transcoded video stream, the transcoded audio stream and the processed subtitle stream, further with the metadata.

15. The method of claim 9 wherein the moving image transcoder hardware operates via a plurality of first moving image transcoding blocks and the moving image transcoder software operates via a plurality of complementary second moving image transcoding blocks and wherein the configuration data indicates operation via a subset of the plurality of first moving image transcoding blocks and the plurality of second moving image transcoding blocks.

16. The method of claim 9 wherein the audio transcoder hardware operates via a plurality of first audio transcoding blocks and the audio transcoder software operates via a plurality of complementary second audio transcoding blocks and wherein the configuration data indicates operation via a subset of the plurality of first audio transcoding blocks and the plurality of second audio transcoding blocks.

* * * * *